Nov. 7, 1933.  F. C. HOLTZ ET AL  1,933,590
MOTOR
Filed June 2, 1930   2 Sheets-Sheet 1
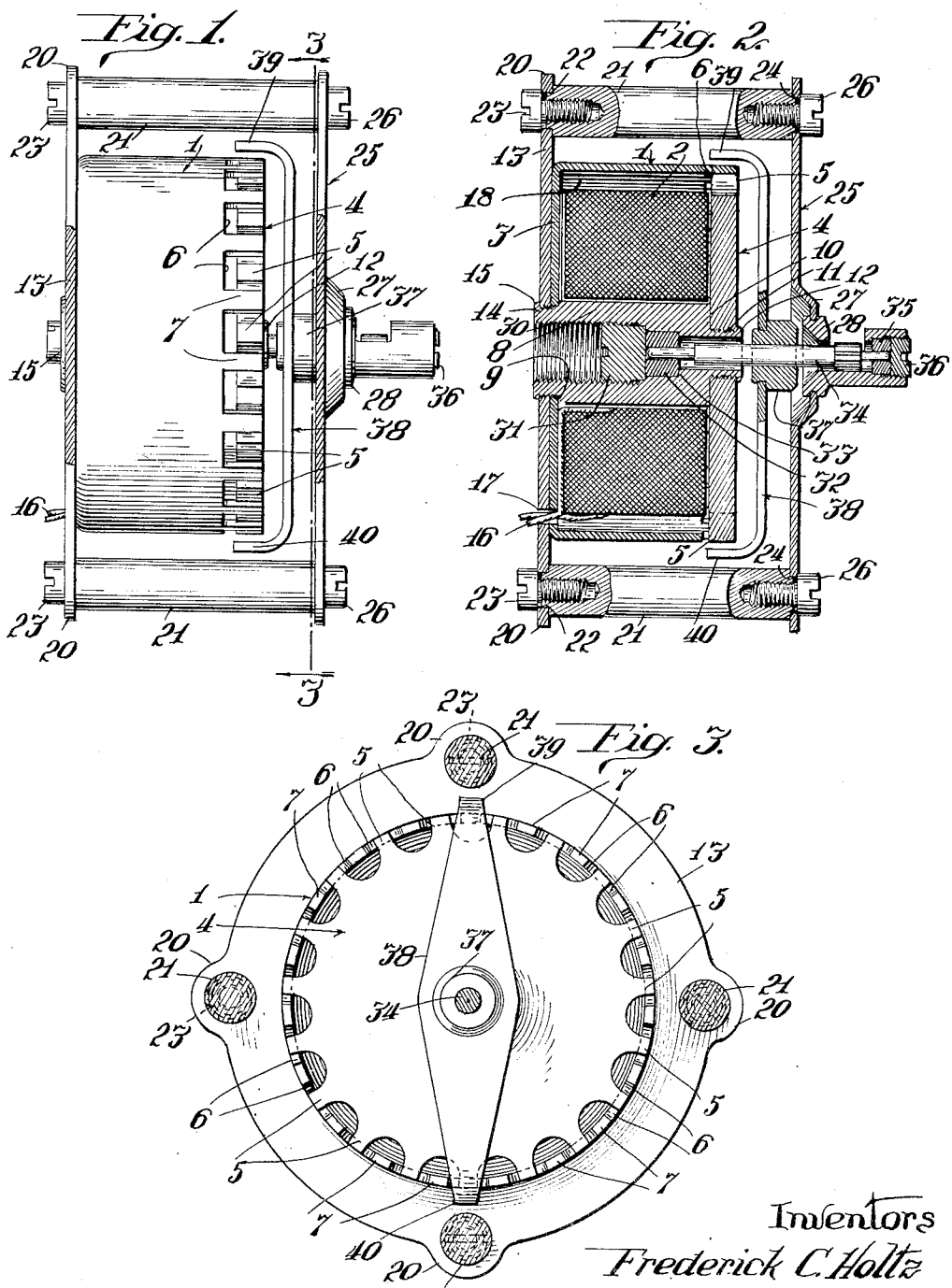
Inventors
Frederick C. Holtz
and Fred Kurz
By Brown, Jackson, Boettcher & Dienner
Attorneys.
Witness
Milton Lenoir

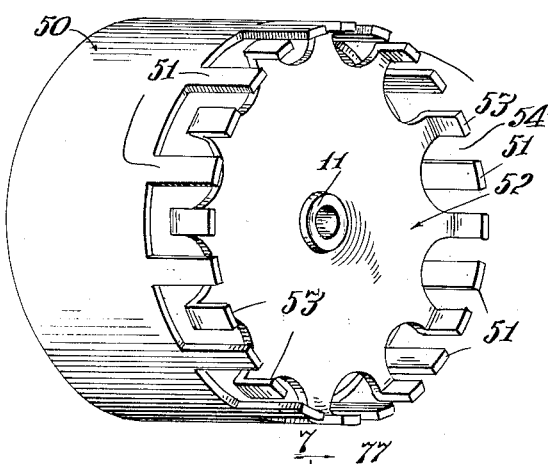
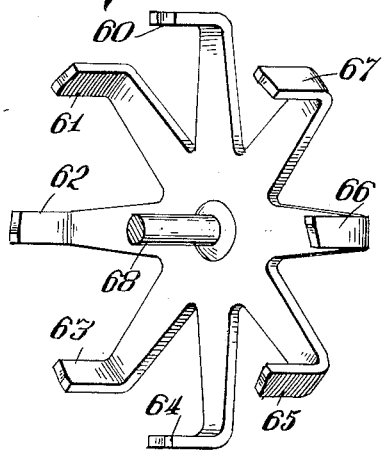
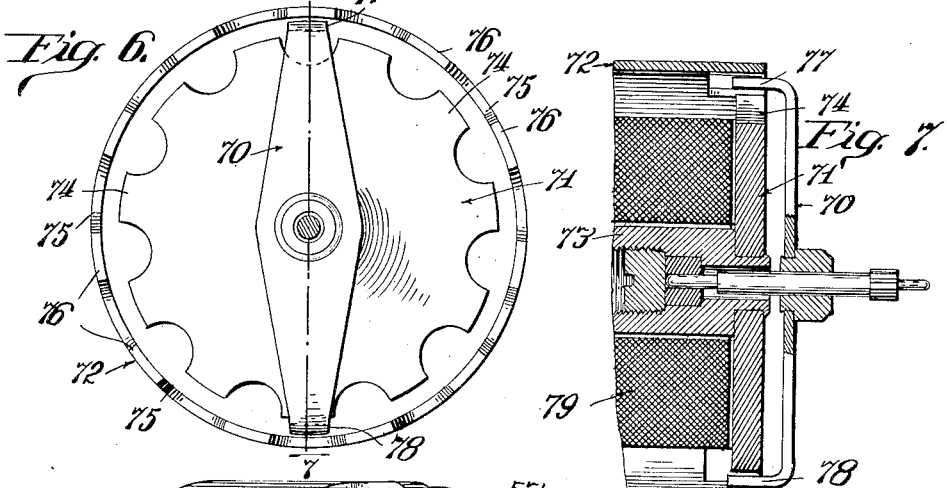
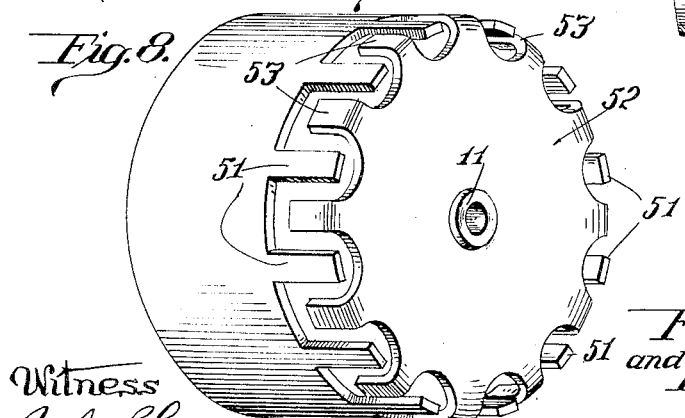

Patented Nov. 7, 1933

1,933,590

UNITED STATES PATENT OFFICE 1,933,590

MOTOR

Frederick C. Holtz and Fred Kurz, Springfield, Ill., assignors to Sangamo Electric Company, Springfield, Ill., a corporation of Illinois Application June 2, 1930. Serial No. 458,947

9 Claims. (Cl. 172—275)

This invention relates to alternating current motors of the synchronous type, and more specifically relates to motors of this type suitable for driving the mechanism of clocks, demand registers, and other similar devices.

It is the object of our invention to provide a synchronous motor whose simple design permits inexpensive construction, and at the same time to provide a motor which is rugged and compact and which will maintain accurate synchronism with the alternating current driving it. Motors built in accordance with the teachings of our invention have a high synchronous speed torque per watt input, and can be readily brought into step for synchronous running.

In the Patent No. 1,747,870 issued to Frederick C. Holtz on February 18, 1930, there is described an induction reaction motor suitable for use in driving clocks, demand registers and the like. The preferred embodiment of our present invention mechanically resembles the motor of this prior patent, but embodies certain improvements over that construction which will be hereinafter pointed out.

Now to acquaint those skilled in the art with the teachings of our invention, reference is made to the accompanying drawings in which a preferred embodiment of it is shown by way of example, and in which:

Figure 1 is a side elevational view of a completely assembled motor embodying the principles of our invention;

Figure 2 is a cross-sectional view taken along the vertical diameter of the motor shown in Figure 1;

Figure 3 is a cross-sectional view taken along the line 3—3 of Figure 1 looking in the direction of the arrows;

Figure 4 is a perspective view of a slightly modified form of stator;

Figure 5 is a perspective view of a slightly modified form of rotor;

Figure 6 is a plan view of a modified form of motor embodying the principles of our invention;

Figure 7 is a cross-sectional view taken along the line 7—7 of Figure 6 looking in the direction of the arrows; and Figure 8 is a perspective view of a modified form of stator.

Referring to the drawings now in more detail, a motor constructed in accordance with the teachings of our invention comprises a cylindrical stator 1 in which is disposed a coil 2. The stator is cup shaped and consists of a disc member 3 and circular flange member 1 disposed there around. The open end of the cup is closed by a toothed disc 4, the teeth 5 of which project into slots 6 between adjacent teeth 7 on the cup 1. The stator thus comprises a ring of pole teeth or pole pieces 7 on the cup-shaped stator member 1, 3 and a ring of pole pieces 5 on the disc member 4, with the pole pieces 5 substantially aligned radially with the spaces or slots 6 between the pole pieces 7.

In the embodiment chosen for illustration in Figures 1, 2 and 3, each space 6 is shown as being approximately twice the width of each tooth 7, such being the preferred proportions, although the width of each space 6 might be reduced to not much wider than each tooth 7 (or tooth 5), or might be increased to more than twice the width of each tooth 7. The teeth 5 are of approximately the same width as the teeth 7 and their length, i. e., the thickness of the disc 4, is substantially less than the length of the teeth 7. By this arrangement, an air gap is extended completely around the interlaced portions of teeth 5 and 7, for a purpose which will be hereinafter explained. These preferable proportions between the widths of the teeth and width of the air gaps, may of course be varied within the teachings of our invention.

In the assembly of a motor of this type, the disc part 3 of the stator cup is threaded or fitted onto a magnetic core 8 against a shoulder 9 thereon. The opposite end of the magnetic core 8 contains a shoulder 10 out of the center of which a threaded boss 11 is projected, and the disc 4 is threaded on this boss. The end of the boss projects through the disc and is peened over at 12 to securely lock the disc against the shoulder 10.

Obviously if desired, the thread on the boss 11 may be omitted and the disc 4 provided with a hole which accurately fits over the boss, the disc in this instance being securely held against the shoulder 10 by the peened end 12 of the boss.

A mounting plate 13 is disposed adjacent the disc 3 of the stator cup, this plate and the disc preferably being threaded onto the projection 14 of the hub 8, after which the projecting end of this portion 14 is peened over at 15 to securely lock the members together. Here again, if desired, the threads may be omitted and the parts secured together solely by the riveted end of the projection 14 of the hub.

The coil 2 is thus securely bound in the cup by the discs 3 and 4, the coil snugly fitting around the outside surface of the core 8. The outside diameter of the coil 2 is preferably substantially less than the inside diameter of the circular flange 1, so that there is an annular space 18 between the outer surface of the coil and the flange 1. The electrical connections 16 leading into the coil 2 are carried through a hole 17 in the back plate 13 which registers with a corresponding hole in the disc 3 leading into the interior of the stator.

The mounting plate 13 carries a plurality of projecting ears 20 in which spacing posts 21 are mounted by tenons 22 and secured by screws 23 projecting through the plate 13 into the threaded ends of the posts. The opposite ends of these posts are provided with similar tenons 24 which register with openings in a front non-magnetic plate 25, which is secured to the posts by screws 26.

Centrally located in the front plate 25 is a hub-like cup 27 which supports the hub member 28, the hub member being attached to the cup in any preferred manner such as by staking.

The core 8 of the stator is also provided with a stepped opening axially extending through it, the larger diameter portion of this opening being threaded at 30 to receive a screw 31 which bears against a bearing block 32 and holds it against the shoulder 33. The shaft 34 of the rotor extends through the small diameter portion of the opening in the core 8, and is suitably journaled in the bearing block 32. The opposite end of the shaft 34 is journaled in a bearing block 35 which is similarly held in the hub member 28 by a screw 36 threaded therein.

The rotor shaft 34 carries a hub 37 upon which is mounted the rotor 38 which is attached to the hub in any preferred manner such as by staking.

As will be best seen in Figure 2, the rotor member 38 is of substantially C-shape, having ends or pole pieces 39 and 40 which fit outside of the stator. This rotor is polarized, with the two pole pieces of opposite magnetic polarity.

When the leads 16 are connected to a source of alternating current, a magneto-motive force is set up in the coil 2, which during one-half of the cycle drives flux through the core 8 into the disc 4, and thence into the teeth 5 of that disc. This flux spans the air gaps 6 and enters the teeth 7 of the stator flange 1, returning to the coil 2 through that flange and the disc 3. During the other half of the cycle, flux flows in the opposite direction, that is from the coil through the core 8, disc 3, flange 1, teeth 7, across the air gap into the teeth 5 and thence through the disc 4 and core 8 into the coil.

At any given instant, the magnetic polarity of the teeth 7 is opposite to that of the teeth 5.

The number of teeth 7 and teeth 5 in the stator depends upon the number of poles on the rotor. If the rotor is a two pole rotor, such as 38, there will preferably be an odd number of poles 5 and an odd number of poles 7 on the stator. The number of pairs of poles on the stator determines the speed at which the rotor will travel when the motor is energized by alternating current of a given frequency. Thus the choice of number of poles both on the stator and rotor is a matter of design dependent upon the speed at which it is desired to have the motor operate.

The rotor 38 is constructed of magnetic steel of high retentivity such as a cobalt steel, for example, and is magnetized to form a permanent magnet prior to its assembly in the motor. The one pole piece, 39 for example, becomes a north magnetic pole and the other pole piece 40 becomes a south magnetic pole. As will be apparent in Figure 3, when the stator pole pieces 7 are magnetized to become north poles, and the north pole 39 of the rotor is in the position shown in this figure, the two north poles will be adjacent and will repel each other. Assuming the rotor to be in motion in a counterclockwise direction, this repulsion will exert a torque on the rotor to drive it onward. At the same time, the stator poles 5 will be south poles and will attract the north magnetic pole 39 of the rotor and add to the torque on the rotor. Simultaneously, the south magnetic pole 40 of the rotor is passing by a south magnetic pole 5 of the stator and will be repelled toward the adjacent north magnetic pole 7 so that the rotor will be placed under additional torque which causes it to continue its rotation.

One-half a cycle later, the magnetic poles 5 become north magnetic poles and the magnetic poles 7 become south magnetic poles, at which time the north magnetic pole 39 of the rotor is standing opposite a pole 5 and the south magnetic pole 40 of the rotor opposite a south magnetic pole 7 on the stator so that the force of repulsion is continued. The alternation of polarity of the poles 5 and 7 in effect produces a rotating field which the permanent magnet poles of the rotor follow around the stator so that the rotor is locked in synchronism with the current and travels at synchronous speed therewith. Since the magnetic poles on the rotor are strong and permanent, the rotor is definitely keyed in synchronism and remains in synchronism as long as the motor is energized.

In a motor of this type, the rotor must usually be started either by mechanical or electrical means to bring it approximately to synchronous speed; that is the motor inherently is not a self-starting motor.

In the motor illustrated in Figures 1 to 3, inclusive, the pole pieces of the rotor overlap the stator and run around the outside edge of the stator. The diameter of the disc 4 is such that the outer ends of its poles 5 lie in the plane of the outer surface of the stator flange and its poles 7 so that the poles 39 and 40 of the rotor can be accurately spaced with a small clearance between them and the smooth cylindrical surface of the stator. In certain instances, it may be advantageous to have the rotor revolve inside of the cylinder, and in Figure 4 we have shown a modified stator construction which permits this operation.

The stator consists of a cup having a flange member 50 with teeth 51 formed in the edge of the member as before. The disc 52 is provided with teeth 53 which are bent at right angles to the plane of the disc and into the cylinder formed by the flange 50. When the disc is assembled on the core in the cylinder 50, in the manner pointed out in connection with Figure 2, with the teeth 52 substantially aligned radially with the spaces between the teeth 51, the outer surfaces of the teeth 53 on the disc 52 lie in the cylinder of the teeth 51 and the inside surfaces of the teeth 53 likewise lie in a cylinder formed by the inside surfaces of the teeth 51. The teeth 50 and 51 project to the right beyond the surface of the disc 52 and a rotor, such as the rotor 38, is formed to fit inside of these teeth, and is spaced away from them and from the disc 52 sufficiently to permit this free rotation within the area defined jointly by the teeth 51 and 53. Otherwise the motor may be constructed as hereinbefore explained, and may have any number of stator teeth dependent upon the speed at which the motor is to be operated.

In certain instances, it may be advantageous to construct the rotor so that it has more than two poles. In Figure 5 we have shown an eight pole rotor by way of example. The poles 60, 62, 64 and 66 will be magnetized to one magnetic polarity, say, north, and the poles 61, 63, 65 and 67 will be magnetized to the opposite magnetic polarity, becoming south poles. The rotor is mounted on the shaft 68 in any preferred manner and cooperates with the stator piece to be rotated by the alternations of flux produced therein.

When a rotor having eight poles is employed, an even number of teeth on the stator disc and on the stator cylinder are employed, preferably the number of teeth being such that when the sum of the teeth on the disc and cylinder is divided by the number of teeth on the rotor the quotient is an odd number. If for example the rotor has eight poles and the stator has a total of twenty-four teeth or poles, the quotient will be three, an odd number, which we have found to be a satisfactory combination. This relation of the number of poles on the stator to the number of poles on the rotor may of course be modified within the teachings of our invention.

In the design of rotors, we have found it advantageous to make the width of the poles of the rotor substantially equal to or slightly greater than the width of the teeth or poles on the stator. For example, the teeth 60 to 67 of the rotor in Figure 5 will each have a width substantially equal to or slightly greater than the width of the teeth 51 and 53 on the stator in Figure 4. If greater than the width of the stator teeth, the width of the rotor poles is preferably less than the width of a stator tooth plus the width of the air gap between that tooth and an adjacent tooth, for example, the width of the pole 60 should be less than the width of the stator tooth 53 plus the width of the air gap 54 intervening between that tooth and the adjacent tooth 51. The length of the poles on the rotor is preferably sufficient that when the rotor is mounted with proper clearance between it and the stator the pole of the rotor will embrace substantially all of the area of the teeth on the stator disc, that is the length of the pole 60 should be substantially the same as the length of the teeth 53 on the stator disc 52. These proportions, while preferable are not limiting and may be varied to meet particular conditions within the teachings of our invention.

In Figure 8, we have shown a slightly modified form of stator substantially like that shown in Figure 4, except that the disc 52 is turned in an opposite direction so that its teeth 53 point inwardly between the teeth 51 on the stator cylinder 50 rather than outwardly. The rotor to be used with this embodiment of our invention fits over the outside surface of the cylinder formed jointly by the teeth 53 and 51 in the same manner that the rotor 38 of Figure 2 fits over its stator. This embodiment is advantageous in that it increases the space within the cylinder in which space the coil 2 is fitted, thereby permitting a slightly larger coil to be used without increasing the overall dimensions of the motor, which is advantageous in certain instances.

In Figures 6 and 7, we have shown a modified form of our invention in which the rotor 70 rotates in an annular air gap disposed between the peripheral edge of the stator disc 71 and the inside edge of the stator flange 72. In this embodiment of our invention, the disc 71 is mounted upon the core 73 in the hereinbefore explained manner, the disc being of such diameter that its periphery is spaced from the inside edge of the stator flange 72, thereby forming an annular air gap. Teeth 74 are disposed around the peripheral edge of the disc, and are substantially aligned radially with the air gaps 75 between adjacent teeth 76 of the stator flange, in the manner clearly shown in Figure 6. The rotor 70, illustrated as a two pole rotor by way of example, has pole pieces 77 and 78 which are bent inwardly and disposed midway between the outer ends of the poles 74 and the inner faces of the poles 76, being acted upon by the flux traversing this air gap to rotate the rotor in the hereinbefore explained manner. The coil 79 in this embodiment of our invention is held in the stator by the disc 71, as in the previously explained embodiments. It will be noted that in each of the above described embodiments the end disc 4, 52 or 71 serves as a magnetic shield between the coil and the main body portion of the rotor for minimizing the passage of leakage flux from the coil to the rotor.

We have found that by using highly polarized rotors in motors of the type herein disclosed, the reaction characteristics of the motor are greatly reduced, and the motors have far less locking torque at standstill and at the same time greater synchronous torque than has been possible of achievement in the types of motors devised heretofore. In this respect, we have found that the behavior of the motor is analagous to that of large synchronous motors operating with and without field excitation. The combination of the low locking torque and high synchronous torque achieved through the design herein disclosed is further advantageous in that it enables the motor to be made self starting merely by properly proportioning the inertia of the rotor with respect to the torques. We have found that the proper proportion will be achieved when the ratio of magnetic moment to the inertia of the rotor is a large quantity, ten for example. The motors also show much higher synchronizing torques, and because of this characteristic we have found that it is much less difficult to bring the motors into synchronism by mechanical means, since it is only necessary to approach synchronous speed to get them to lock into step and run synchronously. We have found also that there is less tendency for a motor of our invention to lock into step at speeds other than that for which they are designed, so that the motor if it operates at all operates at the correct speed for which it is designed.

However, we have found that with the particular type of motor shown, produced in ordinary manufacturing routine, a majority of the motors will start themselves satisfactorily upon sixty cycle alternating current, and that all of the motors will start satisfactorily at a lower frequency, for example, fifty cycles a second. With the frequency below fifty cycles a second, all of the motors reliably start themselves from rest when the current is turned through their coils.

Thus it appears that notwithstanding that the inherent characteristics of a motor having a permanent magnet driven by a pulsating or so-called rotating field to be non-self starting, the particular design shown herein can be made self starting by maintaining a careful balance between magnetic moment of the rotor, i. e., the product of the rotor pole strength and distance between poles, strength of stator field, and inertia of the rotor. Thus by providing low friction bearings of suitable design and by maintaining the inertia of the rotor low, the motor will reliably start itself from standstill upon alternating current frequencies as high as 60 cycles a second. In certain instances the use of a self starting motor of this type is obviously advantageous.

When the motor is used in a clock, for example, and the current is cut off from it for an interval of time, the clock stops and it is necessary to reset it and restart the motor to start the clock in operation again. This is advantageous and in many instances preferable to having the clock stopped when the current is shut off and subsequently started when the current supply is resumed. In this instance, the clock is running but at the same time it is not indicating accurate time since it has been stopped and restarted. By employing a non-self starting motor of the type herein disclosed, in a clock, if the clock is running at all, it is indicating the correct time. When a self starting motor of the type disclosed herein is employed in the clock, it may be desirable to provide a suitable signal such as a target which will be visible if the motor has stopped and subsequently restarted itself without the clock being reset, so that it will be apparent that the time indicated by the clock is not accurate. In certain instances it may be advantageous to provide a spring driven carry over mechanism to keep the clock running during the intervals that the current is disconnected from it.

While we have chosen to show a preferred embodiment of our invention, we have done so by way of example only, as there are many modifications and adaptations which can be made by one skilled in the art without departing from the teachings of the invention.

What we consider new and desire to have protected by Letters Patent is pointed out in the appended claims.

What is claimed is:

1. In a sub-synchronous electric motor, the combination with a stator-structure having a plurality of polar-projections of opposite polarity arranged in interspersed relationship in such manner as to provde a plurality of polar-projections of one polarity, each of which is flanked on each of its respective opposite sides by a polar-projection of opposite polarity; of a rotor of permanent magnet material shaped to form a plurality of pairs of permanently-magnetzed polar-projections; the respective polar-projections of each of said pairs thereof being of permanent opposite polarity and spaced from each other in such manner that when one polar-projection of a given pa'r is aligned with a stator polar-projection of one polarity, the complementary polar-projection of the said pair is aligned with a stator polar-projection of opposite polarity.

2. In a sub-synchronous electric motor, the combination with a stator-structure having a plurality of polar-projections of opposite polarity arranged in interspersed relationship in such manner as to provde a plurality of polar-projections of one polarity, each of which is flanked on each of its respective opposite sides by a polar-projection of opposite polarity; of a rotor of permanent magnet material shaped to form a plurality of pa'rs of permanently-magnetized polar-projections; the respective polar-projections of each of said pairs thereof being of permanent opposite polarity and spaced from each other in such manner that the respective north polarity polar-projections of the said pairs are simultaneously aligned with stator polar-projections of south polarity when the respective south polarity polar-projections of the said pairs are simultaneously aligned with stator polar-projections of north polarity.

3. In a sub-synchronous electric motor, the combination with a stator-structure having polar-projections of opposite polarity; of a rotor having a plurality of polar-projections of L-shaped form cooperating with the polar-projections of the said stator-structure and having one leg of the said L-shaped form extending substantially parallel with the axis of the rotor so as to cause the said polar-projections of the rotor to cooperate with at least two angularly-disposed surfaces of the said stator-structure.

4. In a sub-synchronous electric motor, the combination with a stator-structure having a plurality of polar-projections of opposite polarity arranged in interspersed relationship in such manner as to provide a plurality of polar-projections of one polarity, each of which is flanked on each of its respective opposite sides by a polar-projection of opposite polarity; of a rotor of permanent magnet material shaped to form a plurality of pairs of permanently-magnetized polar-projections; the respective polar-projections of each of said pairs thereof being of permanent opposite polarity and spaced from each other in such manner that when one polar-projection of a given pair is aligned with a stator polar-projection of one polarity, the complementary polar-projection of the said pair is aligned with a stator polar-projection of opposite polarity; the majority of the said polar-projections of the rotor being of L-shaped form one leg of which extends substantially parallel with the axis of the said rotor so as to cause such polar-projections to cooperate with at least two angularly-disposed surfaces of the said stator-structure.

5. In a synchronous electric motor, the combination of a stator structure comprising a stationary magnetic core extending axially of the motor, an energizing winding mounted on said core and extending axially of the motor, two magnetic end members secured d'rectly to opposite ends of said core at opposite ends of said winding, a ring of spaced pole pieces grouped concentrically with respect to said core and magnetically associated with one of said end members, a second ring of spaced pole pieces grouped concentrically with respect to said core and magnetically associated with the other of said end members, said latter pole pieces being substantially aligned radially with the spaces between said first named pole pieces, a rotor of permanently magnetized material comprising a body portion and a plurality of pairs of permanently magnetized polar projections extending therefrom, one of said end members being interposed between said winding and said body portion and serving to shield said body portion from leakage flux, the respective polar projections of each of said pa'rs on the rotor being of permanent opposite polarity and spaced from each other in such manner that when one polar projection of a given pair is aligned with a stator pole piece of one polarity, the complementary polar projection of the sa'd pair is aligned with a stator pole piece of opposite polarity.

6. In a synchronous electric motor, the combination of a stator structure comprising a stationary magnetic core extending axially of the motor, an energizing winding mounted on said core, two magnetic end members secured directly to opposite ends of said core at opposite ends of said winding, a ring of spaced pole pieces grouped concentrically with respect to said core and magnetically associated with one of said end members, a second ring of spaced pole pieces grouped concentrically with respect to said core and magnetically associated with the other of said end members, said latter pole pieces being substantially aligned radially with the spaces between said first named pole pieces, and a rotor mounted at one end of said stator structure, one of said end members being interposed between the adjacent end of said winding and said rotor to shield said rotor from leakage flux, said rotor being of permanently magnetized material comprising permanently magnetized polar projections of opposite polarity, said stator pole pieces and said rotor polar projections being so related that when the north polarity polar projection of said rotor is aligned with one of the stator pole pieces of said first ring, the south polarity polar projection will be substantially aligned with one of the stator pole pieces of said second ring.

7. In a synchronous electric motor, the combination of a stator structure comprising a stationary magnetic core extending axially of the motor, an energizing winding mounted on said core and extending axially of the motor, two magnetic end members secured directly to opposite ends of said core at opposite ends of said winding, a ring of spaced pole pieces grouped concentrically with respect to said core and magnetically associated with one of said end members, a second ring of spaced pole pieces grouped concentrically with respect to said core and magnetically associated with the other of said end members, said latter pole pieces being substantially aligned radially with the spaces between said first named pole pieces, and a rotor of permanently magnetized material comprising permanently magnetized polar projections of opposite polarity rotating in a circle larger than and embracing said first and second rings of stator pole pieces, said stator pole pieces and said rotor polar projections being so related that when the north polarity polar projection of said rotor is aligned with one of the stator pole pieces of said first ring, the south polarity polar projection will be substantially aligned with one of the stator pole pieces of said second ring.

8. In a synchronous electric motor, the combination of a stator structure comprising a stationary magnetic core extending axially of the motor, an energizing winding mounted on said core and extending axially of the motor, two magnetic end members secured directly to the opposite ends of said core at opposite ends of said winding, a ring of spaced pole pieces grouped concentrically with respect to said core and magnetically associated with one of said end members, a second ring of spaced pole pieces grouped concentrically with respect to said core and magnetically associated with the other of said end members, said latter pole pieces being substantially aligned radially with the spaces between said first named pole pieces, said two rings of pole pieces being spaced from each other to define an annular air gap therebetween, and a rotor of permanently magnetized material comprising permanently magnetized polar projections of opposite polarity rotating within said annular air gap between said two rings of pole pieces, said stator pole pieces and said rotor polar projections being so related that when the north polarity polar projection of said rotor is aligned with one of the stator pole pieces of said first ring, the south polarity projection will be substantially aligned with one of the stator pole pieces of said second ring.

9. In a synchronous electric motor, the combination of a stator structure comprising a stationary magnetic core extending axially of the motor, an energizing winding mounted on said core and extending axially of the motor, two magnetic end members secured directly to opposite ends of said core at opposite ends of said winding, a ring of spaced pole pieces grouped concentrically with respect to said core and magnetically associated with one of said end members, a second ring of spaced pole pieces grouped concentrically with respect to said core and magnetically associated with the other of said end members, one of said rings of pole pieces being of larger diameter than the other ring and embracing said latter ring and spaced therefrom to define an annular air gap between said two rings of pole pieces, the pole pieces of said inner ring being substantially aligned radially with the spaces between the pole pieces of said first ring, and a rotor comprising polar projections projecting into said annular air gap between said first and second rings of pole pieces and revolving in said annular air gap.

FREDERICK C. HOLTZ.
FRED KURZ.